US012560381B2

(12) United States Patent
Dinkova et al.

(10) Patent No.: US 12,560,381 B2
(45) Date of Patent: Feb. 24, 2026

(54) INSTALLATION FOR THE THERMAL TREATMENT OF DISPERSIBLE RAW MATERIAL, AND METHOD FOR OPERATING SUCH AN INSTALLATION

(71) Applicants: thyssenkrupp Polysius GmbH, Beckum (DE); Vicat SA, L'Isle-d'Abeau (FR); Dyckerhoff GmbH, Wiesbaden (DE)

(72) Inventors: Anna Ivanova Dinkova, Dortmund (DE); Eike Willms, Dortmund (DE); Jost Lemke, Ennigerloh (DE); Karl Lampe, Ennigerloh (DE)

(73) Assignees: thyssenkrupp Polysius GmbH, Beckum (DE); Vicat SA, L'Isle-d'Abeau (FR); Dyckerhoff GmbH, Wiesbaden (DE)

( * ) Notice: Subject to any disclaimer, the term of this patent is extended or adjusted under 35 U.S.C. 154(b) by 467 days.

(21) Appl. No.: 17/923,176

(22) PCT Filed: May 4, 2021

(86) PCT No.: PCT/EP2021/061721
§ 371 (c)(1),
(2) Date: Nov. 3, 2022

(87) PCT Pub. No.: WO2021/224252
PCT Pub. Date: Nov. 11, 2021

(65) Prior Publication Data
US 2023/0175778 A1 Jun. 8, 2023

(30) Foreign Application Priority Data

May 5, 2020 (BE) .................................... 2020/5300
May 5, 2020 (DE) ..................... 10 2020 205 672.2

(51) Int. Cl.
*F27B 7/42* (2006.01)
*C04B 7/43* (2006.01)
(Continued)

(52) U.S. Cl.
CPC ................ *F27B 7/42* (2013.01); *C04B 7/434* (2013.01); *C04B 7/4476* (2013.01);
(Continued)

(58) Field of Classification Search
CPC ........ F27B 7/42; F27B 7/2033; F27B 7/3205; F27B 7/36; C04B 7/434; C04B 7/4476;
(Continued)

(56) References Cited

U.S. PATENT DOCUMENTS 2,301,855 A 11/1942 Cliffe
3,162,431 A 12/1964 Franz et al.
(Continued)

FOREIGN PATENT DOCUMENTS

CN 201173677 Y 12/2008
CN 101608866 A 12/2009
(Continued)

OTHER PUBLICATIONS

DE3037929A1 translation (Year: 1981).*
(Continued)

*Primary Examiner* — Steven S Anderson, II
*Assistant Examiner* — Kurt Wolford
(74) *Attorney, Agent, or Firm* — thyssenkrupp North America, LLC

(57) ABSTRACT

An installation for thermal treatment of free-floating raw material, in particular cement raw meal and/or mineral products, may include a riser line through which hot gases can flow. The riser line has at least one fuel inlet for introducing fuel into the riser line. The riser line has at least one raw meal inlet for introducing raw meal into the riser
(Continued)

line, which raw meal inlet is arranged upstream of the fuel inlet in a flow direction of gas inside the riser line. Further, a method for thermal treatment of free-floating raw material may involve introducing fuel via a fuel inlet into a riser line for guiding hot gases and introducing raw meal into the riser line. The raw meal is introduced into the riser line upstream of the fuel inlet in the flow direction.

13 Claims, 4 Drawing Sheets

(51) Int. Cl.

| | | |
|---|---|---|
| *C04B 7/44* | (2006.01) |
| *F27B 7/20* | (2006.01) |
| *F27B 7/32* | (2006.01) |
| *F27B 7/36* | (2006.01) |
| *F27D 19/00* | (2006.01) |

(52) U.S. Cl.
CPC .......... *F27B 7/2033* (2013.01); *F27B 7/3205* (2013.01); *F27B 7/36* (2013.01); *F27D 19/00* (2013.01); *F27D 2019/0003* (2013.01); *F27M 2003/03* (2013.01)

(58) Field of Classification Search
CPC ............ F27D 19/00; F27D 2019/0003; F27M 2003/03
See application file for complete search history.

(56) References Cited

U.S. PATENT DOCUMENTS

| | | | |
|---|---|---|---|
| 4,248,639 A | 2/1981 | Quittkat |
| 4,627,877 A | 12/1986 | Ogawa et al. |
| 4,840,561 A | 6/1989 | Unland et al. |
| 4,941,821 A | 7/1990 | Durr et al. |
| 5,292,247 A | 3/1994 | Bauer |
| 5,572,938 A | 11/1996 | Leger |
| 5,649,823 A | 7/1997 | Tutt |
| 5,919,301 A | 7/1999 | Rother et al. |
| 6,012,918 A | 1/2000 | Doumet |
| 6,142,771 A | 11/2000 | Doumet |
| 7,296,994 B2 | 11/2007 | Meyer et al. |
| 7,390,357 B2 | 6/2008 | Skaarup et al. |
| 10,457,599 B2 | 10/2019 | Leibinger |
| 2003/0105381 A1 | 6/2003 | Eckert et al. |
| 2008/0090194 A1 | 4/2008 | Laux et al. |
| 2009/0130615 A1 | 5/2009 | Penfornis et al. |
| 2009/0308073 A1 | 12/2009 | Bonaquist et al. |
| 2010/0037804 A1 | 2/2010 | Paxton et al. |
| 2012/0174832 A1 | 7/2012 | Mathai |
| 2012/0304905 A1 | 12/2012 | Periasamy et al. |
| 2014/0069303 A1 | 3/2014 | Mathai |
| 2014/0366499 A1 | 12/2014 | Sakaniwa et al. |
| 2015/0336845 A1 | 11/2015 | Lampe et al. |
| 2018/0127312 A1 | 5/2018 | Leibinger |
| 2019/0047911 A1 | 2/2019 | Schuermann |
| 2019/0093950 A1 | 3/2019 | Peltonen |
| 2021/0198142 A1 | 7/2021 | Lemke et al. |
| 2021/0198143 A1 | 7/2021 | Liu et al. |
| 2021/0372700 A1 | 12/2021 | Brinkmann et al. |

FOREIGN PATENT DOCUMENTS

| | | |
|---|---|---|
| CN | 102112834 A | 6/2011 |
| CN | 103253879 A | 8/2013 |
| CN | 105080315 A | 11/2015 |
| CN | 106164011 A | 11/2016 |
| CN | 107438747 A | 12/2017 |
| CN | 108474618 A | 8/2018 |
| CN | 109553310 A | 4/2019 |
| CN | 111051802 A | 4/2020 |

| | | | | | |
|---|---|---|---|---|---|
| DE | 1 601 124 A1 | | 5/1970 | | |
| DE | 2801161 A1 | | 7/1979 | | |
| DE | 3037929 A1 | * | 5/1981 | | |
| DE | 3417148 A1 | | 11/1985 | | |
| DE | 37 01 964 A1 | | 8/1988 | | |
| DE | 38 00 895 A1 | | 7/1989 | | |
| DE | 38 17 357 A1 | | 11/1989 | | |
| DE | 38 34 215 A1 | | 4/1990 | | |
| DE | 196 49 922 A1 | | 6/1998 | | |
| DE | 103 27 028 A1 | | 1/2005 | | |
| DE | 603 00 939 T2 | | 5/2006 | | |
| DE | 10 2008 023 899 A1 | | 11/2009 | | |
| DE | 10 2009 041 089 A1 | | 3/2011 | | |
| DE | 10 2013 112 695 A1 | | 6/2014 | | |
| DE | 10 2013 006 140 A1 | | 10/2014 | | |
| DE | 10 2013 020 722 A1 | | 6/2015 | | |
| DE | 10 2015 004 577 B3 | | 9/2015 | | |
| DE | 10 2017 126 961 A1 | | 5/2019 | | |
| DE | 10 2018 206 673 A1 | | 10/2019 | | |
| DE | 10 2020 203 289 A1 | | 9/2021 | | |
| DE | 10 2020 204 519 A1 | | 10/2021 | | |
| DE | 10 2020 204 520 A1 | | 10/2021 | | |
| DE | 10 2020 205 672 A1 | | 11/2021 | | |
| EP | 0 455 301 A2 | | 11/1991 | | |
| EP | 0 526 770 A2 | | 2/1993 | | |
| EP | 1 316 536 A2 | | 6/2003 | | |
| EP | 2086903 A2 | | 8/2009 | | |
| EP | 2 868 635 A1 | | 5/2015 | | |
| EP | 2 881 377 A1 | | 6/2015 | | |
| EP | 3029004 A1 | * | 6/2016 | ............ | B01D 45/16 |
| FR | 2 921 059 A1 | | 3/2009 | | |
| JP | S55-015980 A | | 2/1980 | | |
| JP | S55-085441 A | | 6/1980 | | |
| JP | S55097239 A | * | 7/1980 | | |
| JP | S59-152251 A | | 8/1984 | | |
| JP | S60132513 U | * | 9/1985 | | |
| JP | H11-090371 A | | 4/1999 | | |
| JP | 2006-207924 A | | 8/2006 | | |
| JP | 65-54910 B2 | | 12/2016 | | |
| WO | 99/06778 A1 | | 2/1999 | | |
| WO | 03/074956 A1 | | 9/2003 | | |
| WO | 2005024328 A2 | | 3/2005 | | |
| WO | 2006/113673 A2 | | 10/2006 | | |
| WO | 2013/024340 A1 | | 2/2013 | | |
| WO | 2015/077818 A1 | | 6/2015 | | |
| WO | 2016/038076 A1 | | 3/2016 | | |
| WO | WO-2017220457 A1 | * | 12/2017 | ............ | C04B 7/434 |
| WO | 2019/038148 A1 | | 2/2019 | | |
| WO | 2019/154723 A1 | | 8/2019 | | |
| WO | 2019/211202 A1 | | 11/2019 | | |
| WO | 2021/224129 A1 | | 11/2021 | | |

OTHER PUBLICATIONS

JP_S55097239_A translation (Year: 1980).*
JP_S60132513_U translation (Year: 1985).*
WO-2017220457-A1 translation (Year: 2017).*
EP_3029004_A1 translation (Year: 2016).*
CEMCAP, "CO2 capture from cement production", D8.3 Assessment of calciner test results Revision 1, C.T.G. SPA, 21 pages (2017).
English Translation of International Search Report issued in PCT/EP2021/061721, dated Jul. 13, 2021.
Peray, The Rotary Cement Kiln, 2nd Edition, Chemical Publishing Co., Inc. (1986).
Achternbosch, M. et al., Forschungszentrum Karlsruhe GmbH, Herstellung von Zementklinker, Verfahrensbeschreibung und Analysen zum Einsatz von Sekundärbrennstoffen (2000).
Koring, Kristina Dipl.-ling, Schriftenreihe der Zementindustrie Heft 79/2013, CO2-Emissionsminderungspotential und technologische Auswirkungen der Oxyfuel-Technologie im Zementklinkerbrennprozess (2013).
Taylor, H.F.W., Cement Chemistry, 2nd edition (1997).
Verlag Bau and Technik GmbH, Zement-Taschenbuch, 51. Auflage, Verein Deutscher Zementwerke e.V., Forschungsinstitut der Zementindustrie (2008).

(56)          References Cited

OTHER PUBLICATIONS

Baukal, Jr., Charles E., Industrial Burners Handbook, Industrial Burners Handbook (2003).

Tran, H.N. et al., An overview of ring formation in lime kilns, Kraft Pulping, Tappi Journal, pp. 131-136 (1991).

Pisaroni, M. et al., Counteracting ring formation in rotary kilns, Journal of Mathematics in Industry, pp. 1-19 (2012).

Kawasaki, New Product Introduction, Kawasaki Spouted Bed and Vortex Chamber (DeNOx pre-calciner)—Addressing the global trend of strict environmental regulations, Kawasaki Technical Review, No. 176, p. 59-62 (2016).

Markewitz, P., et al., Forschungszentrum Jülich GmbH, Technologiebericht, 2.3 CO2-Abscheidung und-Speicherung (CCS) innerhalb des Forschungsprojekts TF_Energiewende (2017).

Burgers, K., et al., Oxyfuel Combustion Conference 3, CO2 Processing Unit for Oxy-Fuel Fired Rotary Cement Kiln (2013).

CEMCAP, 23,01, CO2 capture from cement production, 34 pages (2018).

Stadler, Konrad, et al., ZKG International (Process Know-how), Modell-prädiktive, Regelung des Calcinators im Holcim Werk Lägerdorf mit dem ABB Expert Optimizer, No. 3, vol. 60 (2007).

Integrated Pollution Prevention and Control (IPPC), Reference Document on Best Available Techniques in the Cement and Lime Manufacturing Industries, Cement and Lime Manufacturing Industries, 127 pgs. (Dec. 2001).

Pid-Controller, https://web.archive.org/web/20200417150608 /https://en.wikipedia.org/wiki/PID_controller, 26 pgs., Wikipedia (Apr. 17, 2020).

Hökfors, Bodil et al., Modelling the cement process and cement clinker quality, Advances in Cement Research, ice Publishing, vol. 26, issue 6, 8 pages (2014).

Eriksson, M. et al., Oxyfuel combustion in rotary kiln lime production, Energy Science & Engineering, 13 pgs.(2014).

ZKF-Handbuch Zementanlagenbau 2013/2014, Leitfaden für Einsteiger in die Zementindustrie, Heidelberg Cement AG, 76 pgs. (2013).

Zeman, Frank et al., The Earth Institute at Columbia University, The Reduced Emission Oxygen Kiln (Jul. 31, 2008).

Holpert, Morten, et al., Process Control, True optimisation, 5 pgs. (Jul. 2009).

Technologie der Bindebaustoffe, Brennprozess und Brennanlagen, Band 3, VEB Verlag für Bauwesen Berlin, 235 pgs. (1978).

European Cement Research Academy GmbH, Carbon Capture Technology—Options and Potentials for the Cement Industry, 96 pgs. (2007).

European Cement Research Academy GmbH, ECRA CCS Project—Report on Phase III, 107 pgs. (2012).

CEMCAP, Cost of critical components in CO2 capture processes, 35 pgs. (Oct. 20, 2018).

CEMCAP, Status Report on Calciner Technology Revision 2, 26 pgs. (May 1, 2015).

TR-ECRA (European Cement Research Academy) Technical Reports-128/2016, ECRA Carbon Capture and Storage (CSS) Project Report on Phase IV.A, 44 pages (Dec. 2009).

Zhang et al., "Numerical Simulation of Oxy-Fuel Combustion with Different O2/ CO2 Fractions in a Large Cement Precalciner", Energy Fuels, 34: 4949-4957 (2020).

Ditaranto et al., "Study of a full scale oxy-fuel cement rotary kiln", International Journal of Greenhouse Gas Control, 83: 166-175 (2019).

Gerbelová et al., "Feasibility assessment of CO2 capture retrofitted to an existing cement plant: post-combustion vs. oxy-fuel combustion technology", Energy Procedia, 114: 6141-6149 (2017).

IEA Greenhouse Gas R&D Programme (IEA GHG), "CO2 Capture in the Cement Industry", 2008/3 (Jul. 2008).

Carrasco et al., "Experimental investigations of oxyfuel burner for cement production", Fuel 236: 608-614 (2019.).

Hou et al., "Oxy-Fuel Combustion Characteristics of Pulverized Coal under O2/Recirculated Flue Gas Atmospheres", Appl. Sci., 10:1362 (2020).

CEMCAP Report, "CO2 capture from cement production, D 8.1 Status Report on Calciner Technology Revision 2" (2020).

Technical Report, TR-ECRA (European Cement Research Academy) 106/2009 ECRA CCS Project—Report about Phase II of the ECRA study, 83 pages (Jun. 22, 2009).

Xeller, Von H., "NOx-Minderung durch Einsatz eines Stufenbrenners mit Rauchgasrückführung vom Vorwärmer" (Reducing the formation of NOx by using a step burner with exit gas recycling from the preheater), ZKG International, Issue 2, pp. 57-63 (1987).

Chatterjee, Anjan Kumar, Cement Production Technology, Principles and Practice, CRC Press, 440 pages (2018).

Abschlussbericht, AIF-Vorhaben Nr. 17189 N (Final report IGF Project No. 17189 of the German Association for Combustion Research), 130 pgs. (Mar. 2015). English translation attached.

Kwech, L., Stand der Vorcalciniertechnik in der Zementindustrie (Precalcining in the cement industry—in the state of the art), ZKG International, 16 pages (Jul. 7, 1986). English summary included in document.

* cited by examiner

INSTALLATION FOR THE THERMAL TREATMENT OF DISPERSIBLE RAW MATERIAL, AND METHOD FOR OPERATING SUCH AN INSTALLATION

CROSS REFERENCE TO RELATED APPLICATIONS

This application is a U.S. National Stage Entry of International Patent Application Serial Number PCT/EP2021/061721, filed May 4, 2021, which claims priority to German Patent Application No. DE 10 2020 205 672.2, filed May 5, 2020, and Belgian Patent Application No. BE 2020/5300, filed May 5, 2020, the entire contents of all of which are incorporated herein by reference.

FIELD

The present disclosure generally relates to installations for thermal treatment of free-floating raw material, including cement raw meal and/or mineral products.

BACKGROUND

Using calcinators, for example, for the thermal treatment of raw materials, in particular in cement production plants, is known from the prior art. In addition, introducing oxygenated gas for the combustion of carbonaceous fuel in the rotary kiln or the calcinator of a cement production plant is known. To reduce the amount of exhaust gas and to be able to omit complex purification methods, using the most oxygen-rich combustion gas possible is known, for example, from DE 10 2018 206 673 A1, so that the CO2 content in the exhaust gas is high. DE 10 2018 206 673 A1 discloses the introduction of an oxygen-rich gas into the cooler inlet region for preheating the gas and cooling the clinker.

If combustion gases enriched with oxygen are used, which have a high oxygen fraction of at least 30% to 100%, very high temperatures can occur in the calcinator and the furnace. If these high temperatures occur over a longer time period or permanently in the region of the calcinator close to the wall, damage to the inner wall of the calcinator can result therefrom. If hot zones occur in combination with the introduced hot meal, melting phases of the hot meal to be calcinated are also to be expected.

Thus a need exists for an installation for thermal treatment of free-floating materials, wherein safe operation of the installation is to be ensured and an exhaust gas having a high $CO_2$ content is obtained at the same time.

An installation for thermal treatment of free-floating raw material, in particular carbonate-containing materials, preferably cement raw meal and/or mineral products, comprises according to a first aspect a riser line through which hot gases can flow, wherein the riser line has at least one fuel inlet for introducing fuel into the riser line. The riser line has at least one raw meal inlet for introducing raw meal into the riser line, which is arranged upstream of the fuel inlet in the flow direction of the gas within the riser line.

The installation for thermal treatment of free-floating raw material is, for example, a calcinator for the calcination of in particular preheated raw material, for example, in an installation for producing cement or decarbonization of materials containing annealing losses. The installation for thermal treatment of free-floating raw material is arranged, for example, in a facility for producing calcinated limestone or dolomite, for preparing re-calcinated residual materials or FGD gypsum. The raw material is, for example, a mixture of limestone or lime marl and clay, which is supplemented as needed with iron ore, sand, or further materials, or carbonate-containing materials such as limestone, dolomite, or mixtures containing them. The fuel is, for example, carbon, petroleum coke, natural gas, processed residential and industrial wastes, sewage sludge, biomass, or liquid solvents.

The riser line preferably comprises a line extending in the vertical direction, through which a hot gas can flow, in particular from bottom to top. The riser line preferably has a hot gas inlet for the introduction of hot gases having an oxygen fraction of 20% to 100%, preferably 30% to 80%. The lower end of the riser line preferably forms the hot gas inlet for introducing the hot gases into the riser line. The riser line optionally has a combustion gas inlet arranged separately from the hot gas inlet for introducing combustion gas having an oxygen fraction of 20 vol. % to 100 vol. %, in particular 30 vol. % to 80 vol. %. The hot gas is preferably exhaust gas of a combustion installation, for example, a furnace of a cement production plant. The hot gas preferably has an oxygen concentration of 20 vol. % to 100 vol. %, in particular 30 vol. % to 80 vol. %. The riser line has, for example, a plurality of fuel inlets for introducing fuel into the riser line. Each fuel inlet in particular comprises at least one or a plurality of fuel lines, which preferably extend in the radial direction of the riser line and through the wall of the riser line. The riser line preferably has a plurality of raw meal inlets, wherein at least one raw meal inlet is arranged upstream of all fuel inlets. The riser line preferably has two raw meal inlets which are arranged in succession in the flow direction of the gas. At least one fuel inlet is preferably arranged between two raw meal inlets.

The dispensing of the raw meal upstream of the fuel inlet prevents overheating of the raw meal within the riser line and thus, for example, damage to the inner wall of the riser line. The combustion zone generated by the firing of the fuel can emit the heat directly to the particles of the raw meal.

The solid-gas ratio in the installation, preferably the calcinator, is advantageously significantly higher in comparison to conventional installations using air as an oxidizer. Local solid loads of more than 1.5 kg per kilogram of gas occur, for example, in particular 1.5 to 8 kg per kilogram of gas. The largest part, more than 60%, for example approximately 80%, of the fuel heat is preferably implemented in the installation. Due to the introduced raw meal upstream of the fuel inlet, in spite of initial oxygen concentration of 40-80%, which initiates intensive firing, a sufficient heatsink is provided, which prevents overheating. If coarse alternative fuel is to be burned, for example having edge lengths of >100 mm, an inclined region having longer dwell time for the fuel is preferably to be provided. Examples of such inclined regions are steps, push grates, reciprocating grates, or other mechanical or pneumatic devices. These devices function, for example, as combustion chambers, pre-combustion chambers, or are used solely for the drying and preheating or partial gasification of the introduced fuels. The fuels can be of arbitrary types with respect to their grain size distribution and their calorific value.

The calcination reaction optionally runs under CO2 partial pressures between 10%-60% at the beginning of the calcinator and up to 95% at the end of the calcinator. The calcination reaction accordingly runs preferably at higher temperatures than in the conventional installation of 700 to 1100° C., preferably 900-1000° C.

According to a first embodiment, the riser line has at least one inert gas inlet for introducing inert gas into the riser line. For example, the riser line has a plurality of, in particular two or three, inert gas inlets which are arranged in succession in the flow direction of the gas in the riser line. For example, the fuel inlet and the inert gas inlet are arranged separately from one another and each form an inlet into the riser line. The fuel inlet and the inert gas inlet preferably together form an inlet in the riser line. The fuel and the inert gas are preferably supplied to the riser line in a common line in each case. This is less structurally complex and thus more cost-effective. The inert gas is preferably additionally used as a temperature sink and moreover prevents the spontaneous ignition of the introduced fuel directly at the fuel inlet, in particular at a burner orifice or at the burner lance orifice.

The inert gas is, for example, CO2 or water vapor. The supply of inert gas into the installation offers the advantage of a delay, in particular a slowing, of the combustion, so that damage to the installation is prevented.

The riser line has, for example, a plurality of inert gas inlets, in particular for introducing different inert gases. It is also conceivable that the riser line has a plurality of fuel dispensing devices, in particular two or three fuel dispensing devices, with each of which an inert gas inlet is associated. The fuel dispensing devices are preferably arranged spaced apart from one another over the length and/or the width of the riser line. For example, the fuel dispensing devices are arranged offset to one another at an angle of 0°, preferably 60° to 270° over the cross section of the riser line of the calcinator. Different types of fuel dispensing devices can be combined with one another and also arranged differently here.

According to a further embodiment, the riser line has at least two treatment regions arranged in succession in the flow direction of the gas, which optionally have diameters different from one another and wherein the front treatment region in the flow direction of the gas has a raw meal inlet for introducing raw meal into the front treatment region. The front treatment region preferably has a smaller diameter than the treatment regions arranged downstream.

A treatment region is, for example, a section of the riser pipe in which at least one inlet for introducing raw meal, fuel, and/or inert gas is arranged. The front treatment region preferably directly adjoins, in the flow direction of the gas, a cross-sectional constriction having a diameter which is smaller relative to the treatment region and is preferably constant. Each treatment region has, for example, a middle region having a constant diameter and a region arranged in each case before and after it having a changing, decreasing or increasing, diameter. In the flow direction of the gas, the treatment region preferably has an expanding region having a cross section increasing in the flow direction. The region having constant cross section adjoins the expanding region. Preferably a further region having decreasing or expanding cross section adjoins the region having constant cross section. The expanding region having an increasing cross section preferably has an opening angle of 10° to 60°, preferably 12° to 30°. In particular, the front section of the treatment region in the flow direction directly adjoins, with the expanding cross section, a cross-sectional constriction of the riser pipe. The riser pipe preferably has more than two, in particular three or four treatment regions arranged in succession.

According to a further embodiment the riser line has at least one cross-sectional constriction, which has a smaller diameter than the treatment regions, between the treatment regions. A cross-sectional constriction is preferably a section of the riser pipe having a constant diameter which is less than the section of the riser pipe arranged directly before and after the cross-sectional constriction in the flow direction. A cross-sectional constriction is arranged between two adjacent treatment regions, for example. Such a cross-sectional constriction ensures a local acceleration of the flow, wherein this is slowed in the region having a larger diameter adjoining thereon in the flow direction. This ensures thorough mixing of the gas with the raw meal.

According to a further embodiment, the fuel inlet is arranged downstream of the front treatment region.

For example, the installation has two or more fuel inlets, which are in particular all arranged downstream of the front treatment region. Exclusively one or more inlets for introducing raw meal into the riser line are preferably arranged in the front treatment region.

According to a further embodiment, the riser line has a further cross-sectional constriction upstream of the front treatment region. The front treatment region is preferably arranged between two cross-sectional constrictions. At least one part of the raw meal is preferably dispensed into the front treatment region, wherein the cross-sectional constrictions result in a reduction of the flow speed in the treatment region and thus better thorough mixing of the raw meal with the hot gas. Local regions having very high temperatures are avoided and damage to the wall of the riser pipe is thus prevented.

According to a further embodiment, the riser line has at least two raw meal inlets for introducing raw meal into the riser line, wherein the raw meal inlets are each arranged in different treatment regions of the riser line. In particular, the raw meal inlets are arranged at different height levels, preferably in succession in the flow direction of the riser line. Preferably, each treatment region has at least one raw meal inlet. This enables stepped dispensing of raw meal into the riser line, so that raw meal is introduced at different regions of the riser line and mixed optimally with the hot gas in each case.

According to a further embodiment, at least one of the fuel inlets has at least one or a plurality of fuel lines extending in the radial direction of the riser line, which extend through the riser line wall into the riser line and wherein at least one of the raw meal inlets has at least one or a plurality of raw meal lines extending in the radial direction of the riser line, which extend through the riser line wall into the riser line. According to a further embodiment, the fuel line extends at an angle of 0° to 50°, in particular 20° to 30°, relative to the raw meal line into the riser line.

According to a further embodiment, at least one temperature measuring unit for ascertaining the temperature inside the riser line is arranged inside the riser line, wherein the installation has a regulating unit, which is connected to the temperature measuring unit for transmission of the ascertained temperature and wherein the regulating unit is designed in such a way that it regulates the amount of raw meal, inert gas, and/or fuel in the riser line in dependence on the ascertained temperature. Preferably, the raw meal inlets, the fuel inlets, and/or the inert gas inlets each have a metering element, such as a flap or valve, for setting the amount of raw meal, inert gas, or fuel to be introduced into the riser line. The respective metering element is preferably connected to the regulating unit to set the amount of raw meal, inert gas, or fuel to be introduced into the riser line.

The temperature measuring unit preferably involves thermocouples or acoustic gas temperature measurement. The temperature measuring unit is in particular attached to the inner wall of the riser line and is preferably designed to ascertain the gas temperature inside the riser line. For example, the riser line has two temperature measuring units which are arranged in succession in the flow direction. In particular, the temperature measuring units are each associated with one fuel inlet and are arranged downstream, preferably directly at the fuel inlet or in the immediate surroundings. The temperature measuring unit is in particular designed and arranged to ascertain the temperature at or in the vicinity of a fuel inlet.

The regulating unit is preferably designed in such a way that it compares the ascertained temperature to a predetermined temperature limiting value or temperature limiting range and, in the event of a deviation of the ascertained temperature from the temperature limiting value or temperature limiting range, increases or decreases the amount of fuel, raw meal, and/or inert gas in the riser line. If, for example, the temperature ascertained by means of the temperature measuring unit exceeds the temperature limiting value or the temperature limiting range, the amount of fuel, in particular which flows through the fuel inlet associated with the respective temperature measuring unit into the riser line, is reduced. If, for example, the temperature ascertained by means of the temperature measuring unit falls below the temperature limiting value or the temperature limiting range, the amount of fuel, which flows through the fuel inlet associated with the respective temperature measuring unit into the riser line, is increased.

In particular, the regulating unit is designed in such a way that it decreases or increases the amount of inert gas in the riser line if the ascertained temperature deviates from the temperature limiting value or temperature limiting range. If, for example, the ascertained temperature exceeds the temperature limiting value or the temperature limiting range, the amount of inert gas which preferably flows through the inert gas inlet associated with the respective temperature measuring unit into the riser line is reduced. If, for example, the ascertained temperature falls below the temperature limiting value or the temperature limiting range, the amount of inert gas which preferably flows through the inert gas inlet associated with the respective temperature measuring unit into the riser line is increased. The inert gas inlet or fuel inlet associated with the respective temperature measuring unit is preferably the inert gas inlet and fuel inlet which is closest to the respective temperature measuring unit.

If, for example, the temperature ascertained by means of the temperature measuring units exceeds the temperature limiting value or the temperature limiting range, the amount of raw meal which flows through at least one of the raw meal inlets into the riser line is increased. The total amount of raw meal flowing into the riser line preferably remains constant, so that the amount of raw meal is reduced at one raw meal inlet and is increased accordingly at the at least one further raw meal inlet. If, for example, the temperature ascertained by means of the temperature measuring unit falls below the temperature limiting value or the temperature limiting range, the amount of raw meal which flows through at least one of the raw meal inlets is reduced.

Inside the riser line of the installation, for example, at least one guiding element is arranged for guiding the gas flow. Better thorough mixing of the gas with the raw meal is thus preferably achieved. This function has particular importance for the process control using high oxygen contents and low nitrogen contents in that due to the reduced amount of gas in the installation because of the lack of nitrogen fractions, a higher load results after introduction of the material than in installations which are operated using air as an oxidizing agent. For the carrying capacity of the particles, it is therefore advantageous if the material is distributed uniformly over the cross section of the riser line of the calcinator. Sinking of the raw meal into a zone of the riser line located lower downstream is prevented. The guiding element is designed, for example, as a plate, a box, a cone, and/or a pyramid. A plurality of guiding elements is preferably arranged inside the riser line, which are uniformly spaced apart in relation to one another, for example. The guiding elements are formed, for example, from ceramic or a ceramic fiber composite material. The guiding elements are in particular arranged inside the riser line and/or in the fuel inlet. One guiding element is preferably arranged at the outlet of the fuel outlet in the riser line, so that the introduction of fuel into the riser line is guided by means of the guiding element. The guiding element preferably extends from the fuel inlet into the riser line. The guiding element is designed and arranged, for example, in such a way that it guides the fuel at an angle to the inner wall of the riser pipe. For example, the guiding element forms a diffuser with a cross section expanding in relation to the fuel inlet.

For example, the installation has a plurality of fuel dispensing devices, which each comprise a fuel inlet and an inert gas inlet and wherein a guiding element is associated with each fuel dispensing device. The respective fuel dispensing device is arranged, for example, at the same height level as the guiding element or is connected directly upstream or downstream from the guiding element. This enables optimized distribution of the raw meal and the inert gas inside the riser line, in particular in the region of the fuel dispensing device.

The above-described installation is arranged, for example, in a cement factory. Such a cement production plant preferably comprises:
  a preheater for preheating raw meal,
  a calcinator for calcinating the preheated raw meal, wherein the calcinator is an above-described installation,
  a furnace having a furnace burner, for example, a burner lance for firing the calcinated hot meal to form cement clinker, wherein the furnace has a combustion gas inlet for introducing a combustion gas into the furnace having an oxygen fraction of 30% to 100%, and
  a cooler for cooling the cement clinker,
  wherein the calcinator and the furnace each have at least one fuel inlet for introducing fuel into the calcinator and into the furnace.

The calcinator and/or the furnace each have at least one inert gas inlet for respectively introducing inert gas into the calcinator and the furnace. The calcinator is in particular the above-described installation for thermal treatment.

The preheater of the cement production plant preferably comprises a plurality of cyclone stages each having at least one cyclone for separating solids from the gas flow. Between the last and the next-to-last cyclone stage, the calcinator is arranged, which has a riser line in which the raw meal is heated by means of a calcinator firing system which can consist of one or more combustion points.

The raw meal preheated in the preheater and calcinated in the calcinator is subsequently supplied to the furnace. The furnace is preferably a rotary kiln having a rotating tube rotatable around its longitudinal axis, which is preferably slightly inclined in the conveyance direction of the material to be fired, so that the material is moved in the conveyance direction due to the rotation of the rotating tube and gravity. The furnace preferably has a material inlet at one of its ends for introducing preheated, calcinated raw meal and has a material outlet at its end opposite to the material inlet for discharging the fired clinker into the cooler. A furnace head is preferably arranged at the material outlet-side end of the furnace, which has the furnace burner for firing the material and preferably at least one fuel inlet for introducing fuel into the furnace, preferably via a furnace burner and/or via a fuel lance. The furnace preferably has a sintering zone, in which the material is at least partially melted and which in particular has a temperature of 1500° C. to 1900° C., preferably 1450° C. to 1750° C. The sintering zone comprises, for example, the furnace head, preferably the rear third of the furnace in the conveyance direction of the material.

The oxygenated combustion gas is introduced, for example, completely or partially directly into the furnace head, wherein the furnace head has a combustion gas inlet, for example. The combustion gas is preferably introduced completely or partially via the material outlet of the furnace into the furnace. The combustion gas supplied to the furnace has, for example, an oxygen fraction of more than 30% to 75%, preferably more than 95%. The combustion gas consists, for example, completely of pure oxygen, wherein in this case the oxygen fraction of the combustion gas is 100%. The furnace burner can be, for example, a burner lance. The cooler for cooling the cement clinker preferably adjoins the material outlet of the furnace.

The cooler has a conveyor unit for conveying the bulk material in the conveyance direction through the cooling gas chamber. The cooling gas chamber comprises a first cooling gas chamber section having a first cooling gas flow and a second cooling gas chamber section, adjoining thereon in the conveyance direction of the bulk material, having a second cooling gas flow. The cooling gas chamber is preferably delimited on top by a cooling gas chamber cover and on the bottom by a dynamic and/or static grate, preferably by the bulk material resting thereon. The cooling gas chamber is in particular the entire chamber of the cooler above the bulk material through which cooling gas flows. The cooling gas flow flows through the dynamic and/or static grate, in particular through the conveyor unit, through the bulk material, and into the cooling gas chamber. The first cooling gas chamber section is preferably arranged in the flow direction of the bulk material to be cooled directly behind the cooler inlet, in particular the material outlet of the furnace. The clinker preferably falls out of the furnace into the first cooling gas chamber section.

Preferably, exclusively the first cooling gas flow flows into the first cooling gas chamber section, which is accelerated, for example, by means of a fan or pressurized vessel or another corresponding device. The second cooling gas chamber section adjoins the first cooling gas chamber section in the conveyance direction of the bulk material and is preferably separated with respect to gas technology from the first cooling gas chamber section by means of a separating device. Preferably exclusively the second cooling gas flow, which is accelerated by means of at least one fan, for example, flows in the second cooling gas chamber section.

The first cooling gas flow flowing through the first cooling gas chamber section is, for example, pure oxygen or a gas having a fraction of less than 35 vol. %, in particular less than 21 vol. %, preferably 15 vol. % or less nitrogen and/or argon and/or an oxygen fraction of greater than 20.5%, in particular greater than 30% to 75%, preferably greater than 95%. The first cooling gas chamber section preferably directly adjoins the material outlet of the furnace, preferably at the furnace head of the furnace, so that the cooling gas is heated in the cooler and subsequently flows into the rotary kiln and is then used as a combustion gas. The second cooling gas flow is air, for example.

The invention also comprises a method for thermal treatment of free-floating raw material, in particular cement raw meal and/or mineral products, having the following steps:

introducing fuel via a fuel inlet into a riser line for conducting hot gases and introducing raw meal into the riser line, wherein the raw meal is introduced upstream of the fuel inlet into the riser line in the flow direction of the gas.

The advantages and embodiments described with reference to the installation also apply correspondingly according to the method to the method for thermal treatment of raw materials.

The hot gas is preferably introduced via a hot gas inlet, in particular from below, into the riser line, wherein the hot gas in particular has an oxygen concentration of 20 vol. % to 100 vol. %, in particular 30 vol. % to 90 vol. %. A combustion gas is optionally introduced separately from the hot gas into the riser line, wherein the combustion gas has an oxygen fraction of 20 vol. % to 100 vol. %, in particular 30 vol. % to 90 vol. %. Within the riser line, for example, a $CO_2$ partial pressure between 10%-60% is set at the beginning of the riser line and up to 95% is set at the end of the riser line. Preferably, a temperature of 700 to 1100° C., preferably 900-1000° C. is set inside the installation.

According to one embodiment, an inert gas is introduced into the riser line. The inert gas is preferably introduced into the riser line downstream of the raw meal inlet.

According to a further embodiment, the riser line has at least two treatment regions arranged in succession in the flow direction of the gas, which preferably have different diameters from one another, and wherein the raw meal is introduced into the front treatment region in the flow direction of the gas.

According to a further embodiment, the temperature is ascertained by means of at least one temperature measuring unit inside the riser line and wherein the amount of raw meal, inert gas, and/or fuel in the riser line is regulated in dependence on the ascertained temperature.

According to a further embodiment, fuel is introduced into the riser line via at least two fuel inlets arranged in succession in the flow direction of the gas and wherein more fuel is introduced at the front fuel inlet in the flow direction than at the other fuel inlet. The amount of fuel at the front fuel inlet in the flow direction is preferably approximately 20 to 120%, in particular 50 to 100%, of the total amount of fuel supplied to the riser line.

According to a further embodiment, an amount of raw meal is introduced into the front treatment region which corresponds to approximately 20% to 60% of the total amount of raw meal introduced into the riser line.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
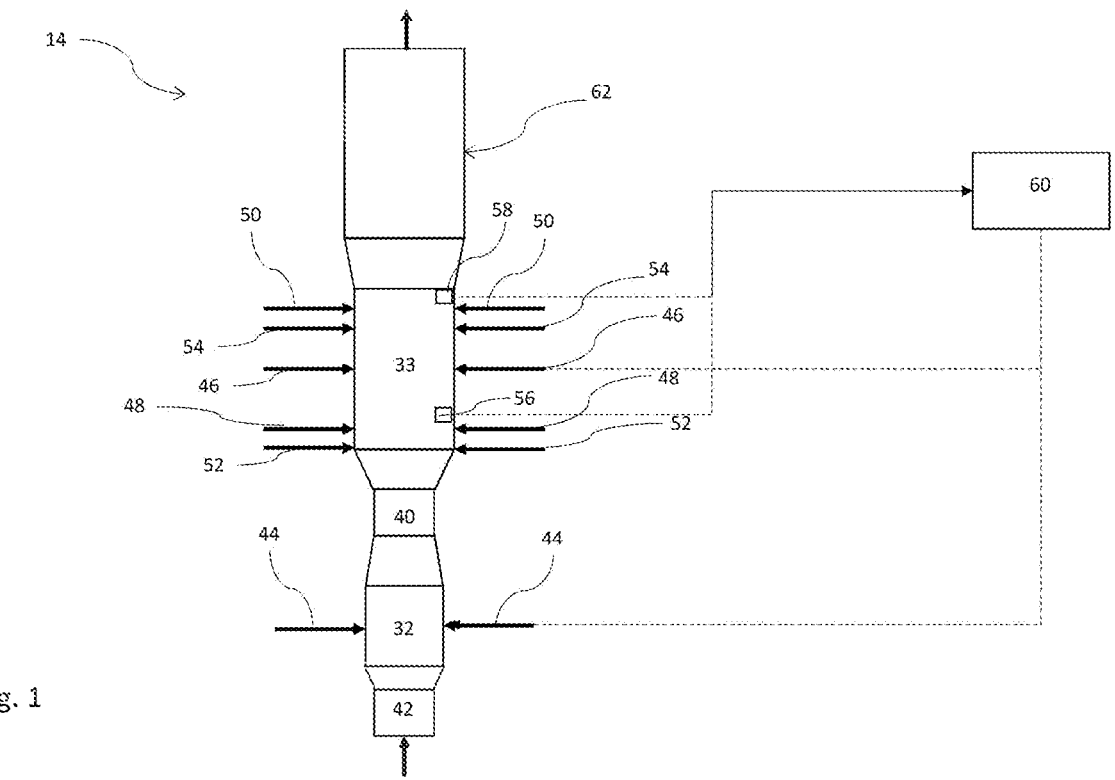
FIG. 1 is a schematic view of an installation for thermal treatment of raw material according to one exemplary embodiment.

FIG. 1 shows an installation 14 for thermal treatment of free-floating raw material, in particular cement raw meal and/or mineral products. Such an installation 14 is in particular a calcinator, which is used, for example, in a cement production plant for calcinating the preheated raw meal. The raw meal is preferably cement raw meal, mineral material, for example, limestone, ores, or clay. The raw meal is preferably a mixture of limestone or limestone marl and clay, which is supplemented if needed with iron ore, sand, or further materials or carbonate-containing materials such as limestone, dolomite, or mixtures containing them.

The installation 14 comprises a riser line 62, through which hot gases can preferably flow from bottom to top. The riser line 62 extends, for example, in the vertical direction and has, in particular at its lower region, an inlet for introducing hot gases, for example, exhaust gases of a combustion unit, such as a rotary kiln of a cement production plant. The flow direction of the hot gas within the riser line 62 is shown by the arrows at the bottom and top end of the riser line 62.

The riser line 62 has a plurality of different diameters. For example, the riser line 62 has two treatment regions 32, 33 arranged in succession in the flow direction of the gas. The first, front treatment region 32 is arranged in the flow direction in front of the second treatment region 33, wherein the diameter of the first treatment region 32 is, for example, less than that of the second treatment region 33. For example, a section of the riser line 62 having a larger diameter than the second treatment region 33 adjoins the second treatment region 33. Each treatment region has, for example, an essentially constant diameter. Between the two treatment regions 32, 33, the riser line 62 has a cross-sectional constriction 40, in particular a region having a smaller diameter than the treatment regions 32, 33 adjoining thereon. For example, the treatment regions 32, 33 each have a section having an essentially constant diameter and a section adjoining thereon having a changing diameter, for example decreasing or increasing. Upstream of the first treatment region 32, the riser line 62 has a further cross-sectional constriction 42, on which the first treatment region 32 of the riser line 62 adjoins, preferably directly. The diameter of the cross-sectional constriction 42 corresponds by way of example to the diameter of the cross-sectional constriction 40 arranged between the two treatment regions 32, 33. Each treatment region 32, 33 has in particular at least one inlet for introducing raw meal, fuel, or inert gas.

At the lower end of the riser line 62, for example at the cross-sectional constriction 42, for example, a furnace intake of a rotary kiln of a cement production plant adjoins, wherein the furnace exhaust gas is conducted through the furnace intake to the riser line. It is also conceivable that the lower end of the riser line 62 is connected to the exhaust gas line of an installation for burning lime.

The installation 14 has a first raw meal inlet 44, which is attached in the first treatment region 32 of the riser line 62. The raw meal inlet 44 preferably has at least one or a plurality of raw meal lines, which extend in the radial direction of the riser line and are arranged, for example, circumferentially around the riser line at one height level. The raw meal lines preferably each extend through the wall of the riser line 62 into the first treatment region 32. The first raw meal inlet 44 is arranged, for example, in the vertical direction centrally in the first treatment region 32. The installation 14 has a second raw meal inlet 46 which is designed, for example, identically to the first raw meal inlet 44 and is arranged, preferably centrally, in the second treatment region 33.

The installation 14 has, for example, two fuel inlets 48, 50, which are both arranged in the second treatment region 33. The fuel inlets 48, 50 each have, for example, at least one or a plurality of fuel lines, which extend in the radial direction of the riser line 62 and are arranged, for example, circumferentially around the riser line 62 at one height level. The fuel lines preferably each extend through the wall of the riser line 62 into the second treatment region 33. The fuel inlets 48, 50 are arranged in succession in the flow direction of the gas in the second treatment region 33 at different height levels of the riser line 62. For example, the first fuel inlet 48 is arranged in a lower region, in particular inlet region, and the second fuel inlet 50 is arranged in an upper region, in particular outlet region, of the second treatment region 33. The first fuel inlet 48 is arranged, for example, upstream of the second raw meal inlet 46 and the second fuel inlet 50 is arranged, for example, downstream of the second raw meal inlet 46.

The installation 14 has, for example, two inert gas inlets 52, 54, which each open into the second treatment region 32. The first inert gas inlet 52 is arranged, for example, upstream of the second raw meal inlet 46 and the second inert gas inlet 54 is arranged, for example, downstream of the second raw meal inlet 46.

The installation 14 furthermore has two temperature measuring units 56, 58, which are both attached inside the second treatment region 33. For example, the temperature measuring units 56, 58 are each associated with one fuel inlet 48, 50 and are arranged downstream, preferably directly at the fuel inlet 48, 50 or in the immediate surroundings. The first temperature measuring unit 56 is associated, for example, with the first fuel inlet 48 and the second temperature measuring unit 58 with the second fuel inlet 50.

The installation 14 furthermore has a regulating unit 60, which is connected to the temperature measuring units 58 to transmit the ascertained temperature. The regulating unit 60 is preferably connected to the first and the second raw meal inlet 44, 46 to regulate the amount of raw meal flowing through the respective raw meal inlet 44, 46 into the riser line 62. The regulating unit 60 is optionally connected to the fuel inlets 48, 50 and/or the inert gas inlets 52, 54 to regulate the amount of fuel and/or inert gas flowing through the respective fuel inlet 48, 50 and/or inert gas inlet 52, 54 into the riser line 62. The raw meal inlets 46, 48, the fuel inlets 48, 50, and/or the inert gas inlets 52, 52 have, for example, metering units, such as flaps or valves, via which the respective amount of raw meal, fuel, and inert gas can be adjusted. The metering units are preferably connected to the regulating unit.

The regulating unit 60 compares the ascertained temperature, preferably to a predetermined temperature limiting value or temperature limiting range. In particular, the regulating unit 60 is designed in such a way that it decreases or increases the amount of fuel in the riser line 62 if the ascertained temperature deviates from the temperature limiting value or temperature limiting range. If, for example, the temperature ascertained by means of one of the temperature measuring units 56, 58 exceeds the temperature limiting value or the temperature limiting range, the amount of fuel which flows through the fuel inlet 48, 50 associated with the respective temperature measuring unit 56, 58 into the second treatment region 33 is reduced. If, for example, the temperature ascertained by means of one of the temperature measuring units 56, 58 falls below the temperature limiting value or the temperature limiting range, the amount of fuel which flows through the fuel inlet 48, 50 associated with the respective temperature measuring unit 56, 58 into the second treatment region 33 is increased.

In particular, the regulating unit 60 is designed in such a way that it decreases or increases the amount of inert gas in the riser line 62 if the ascertained temperature deviates from the temperature limiting value or temperature limiting range. If, for example, the temperature ascertained by means of one of the temperature measuring units 56, 58 exceeds the temperature limiting value or the temperature limiting range, the amount of inert gas which flows through the inert gas inlet 52, 54 associated with the respective temperature measuring unit 56, 58 into the second treatment region 33 is reduced. If, for example, the temperature ascertained by means of one of the temperature measuring units 56, 58 falls below the temperature limiting value or the temperature limiting range, the amount of inert gas which flows through the inert gas inlet 52, 54 associated with the respective temperature measuring unit 56, 58 into the second treatment region 33 is increased. The inert gas inlet 52, 54 or fuel inlet 48, 50 associated with the respective temperature measuring unit 56, 58 is preferably the inert gas inlet 52, 64 and fuel inlet 48, 50 which is closest to the respective temperature measuring unit 56, 58.

In particular, the regulating unit 60 is designed in such a way that it decreases or increases the amount of raw meal in the riser line 62 if the ascertained temperature deviates from the temperature limiting value or temperature limiting range. If, for example, the temperature ascertained by means of one of the temperature measuring units 56, 58 exceeds the temperature limiting value or the temperature limiting range, the amount of raw meal which flows through at least one of the raw meal inlets 44, 46 is increased. Preferably, the total amount of raw meal flowing in the riser line 62 remains constant, so that the amount of raw meal is reduced at one raw meal inlet 44 and is increased accordingly at the at least one further raw meal inlet 46. If, for example, the temperature ascertained by means of one of the temperature measuring units 56, 58 falls below the temperature limiting value or the temperature limiting range, the amount of raw meal which flows through at least one of the raw meal inlets 44, 46 is reduced. For example, if a limiting value or limiting range is not reached, the amount of raw meal which flows through the second raw meal inlet 46 into the second treatment region 33 is reduced and the amount of raw meal through the first raw meal inlet 44 is increased accordingly.

Figure 2:
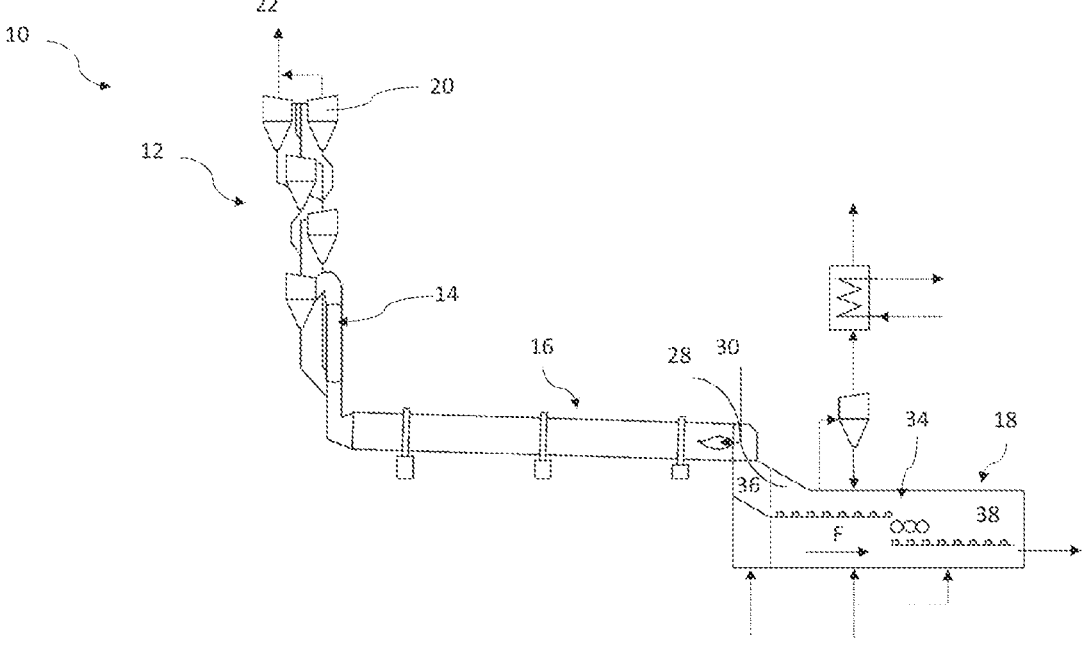
FIG. 2 is a schematic view of a cement production plant having an installation for thermal treatment.

FIG. 2 shows a cement production plant 10 having a single-strand preheater 12 for preheating raw meal, a calcinator 14 for calcinating the raw meal, a furnace 16, in particular a rotary kiln for firing the raw meal to form clinker, and a cooler 18 for cooling the clinker fired in the furnace 16. The calcinator 14 is, for example, an installation for thermal treatment described with reference to FIG. 1.

The preheater 12 comprises a plurality of cyclones 20 for separating the raw meal from the raw meal gas flow. For example, the preheater 12 has five cyclones 20, which are arranged in four cyclone stages one below another. The preheater 12 has a material inlet (not shown) for introducing raw meal into the uppermost cyclone stage of the preheater 12, comprising two cyclones 20. The raw meal flows through the cyclones 20 of the cyclone stages in succession in counter flow to the furnace and/or calcinator exhaust gas and is thus heated.

The calcinator 14 is arranged between the last and the next-to-last cyclone stage. The calcinator 14 has a riser line, in particular a riser pipe, having at least one calcinator firing system for heating the raw meal, so that calcination of the raw meal takes place in the calcinator 14. Furthermore, the calcinator 14 has a fuel inlet for introducing fuel and an inert gas inlet for introducing an inert gas into the riser line. The calcinator 14 furthermore has a combustion gas inlet for introducing, for example, oxygenated combustion gas into the riser line of the calcinator 14. The combustion gas is in particular the furnace exhaust gas enriched with oxygen. The oxygen fraction of the combustion gas is, for example, at most 85% between the furnace 16 and the calcinator 14. The calcinator exhaust gas is introduced into the preheater 12, preferably into the next-to-last cyclone stage, and leaves the preheater 12 after the uppermost cyclone stage as preheater exhaust gas 22.

The calcinator 14 has, for example, two fuel dispensing devices. It is also conceivable that the calcinator 14 only has precisely one fuel dispensing device or more than two fuel dispensing devices. The two fuel dispensing devices are optionally attached spaced apart from one another on the riser line 62 of the calcinator 14. In particular, the fuel dispensing devices are attached at different height levels to the riser line 62. Each fuel dispensing device is respectively associated with one fuel inlet 48, 50 and one inert gas inlet 52, 54, so that fuel and inert gas are conducted into the respective fuel dispensing device. The fuel dispensing devices are arranged, for example, offset by 180° in relation to one another. For example, the fuel dispensing device has a means for transporting the fuel, such as a conveyor screw or a chute. The introduction of the fuel or fuels can also take place pneumatically, for example, by the conveyance with the aid of an inert gas. The raw meal inlet in the calcinator 14 is formed, for example, by the solid outlet of the next-to-last cyclone stage.

In the flow direction of the raw meal, the furnace 16 is connected downstream of the preheater 12, so that the raw meal preheated in the preheater 12 and calcinated in the calcinator 14 flows into the furnace 16. The material inlet/gas outlet of the furnace 16 is directly connected to the riser line of the calcinator 14, so that the furnace exhaust gas flows into the calcinator 14 and subsequently into the preheater 12. The furnace 16 is, for example, a rotary kiln having a rotating tube rotatable around its longitudinal axis, which is arranged at a slightly falling angle. The furnace 12 has a furnace burner 28 at the material outlet-side end inside the rotating tube and an associated fuel inlet 30. The material outlet of the furnace 16 is arranged at the end of the rotating tube opposite to the material inlet 25, so that the raw meal is conveyed inside the rotating tube by the rotation of the rotating tube in the direction of the furnace burner 28 and the material outlet. The raw meal is fired inside the furnace 16 to form cement clinker. The sintering zone comprises the material outlet-side, rear region of the rotating tube, preferably the rear third in the material flow direction.

A fuel inlet 30 and an inert gas inlet are associated with the furnace burner 28, for example, so that fuel and inert gas are guided to the furnace burner 28. The fuel inlet 30 and the inert gas inlet are formed, for example, separately from one another or as a common inlet into the calcinator 14 or the furnace 16. The inert gas is, for example, CO2 or water vapor. The inert gas can be used both as a conveyance means and also to influence the ignition or control of the combustion process.

The cooler 18 for cooling the clinker adjoins the material outlet of the furnace 16. The cooler 18 has a cooling gas chamber 34, in which the clinker is cooled by a cooling gas flow. The clinker is conveyed in the conveyance direction F through the cooling gas chamber 34. The cooling gas chamber 34 has, for example, a first cooling gas chamber section 36 and a second cooling gas chamber section 38, which adjoins the first cooling gas chamber section 36 in the conveyance direction F. The furnace 16 is connected via the material outlet of the furnace 16 to the cooler 18, so that the clinker fired in the rotary kiln 20 falls into the cooler 18.

The first cooling gas chamber section 36 is arranged below the material outlet of the furnace 16, so that the clinker falls from the furnace 16 into the first cooling gas chamber section 36. The first cooling gas chamber section 36 represents an intake region of the cooler 18 and preferably has a static grate, which receives the clinker exiting from the furnace 16. The static grate is in particular arranged completely in the first cooling gas chamber section 36 of the cooler 10. The clinker preferably falls out of the furnace 16 directly onto the static grate. The static grate preferably extends completely at an angle of 10° to 35°, preferably 14° to 33°, in particular 21° to 25° in relation to the horizontal, so that the clinker slides along the static grate 40 in the conveyance direction.

The second cooling gas chamber section 38 of the cooler 18 adjoins the first cooling gas chamber section 36. In the first cooling gas chamber section 36 of the cooler 18, the clinker is in particular cooled to a temperature of less than 1000° C., wherein the cooling takes place in such a way that complete solidification of liquid phases present in the clinker into solid phases takes place. Upon leaving the first cooling gas chamber section 36 of the cooler 18, the clinker is preferably provided completely in the solid phase and at a temperature of at most 1150° C. In the second cooling gas chamber section 38 of the cooler 18, the clinker is cooled further, preferably to a temperature of less than 100° C. The second cooling gas flow can preferably be divided into multiple partial gas flows which have different temperatures.

The static grate of the first cooling gas chamber section 36 has, for example, passages through which a cooling gas enters the cooler 18 and the clinker. The cooling gas is generated, for example, by at least one fan, blower, or pressurized container arranged below the static grate, so that a first cooling gas flow flows from below through the static grate into the first cooling gas chamber section 36. The first cooling gas flow is, for example, pure oxygen or a gas having a fraction of 15 vol. % or less nitrogen and a fraction of 30 vol. % or more oxygen. The first cooling gas flow flows through the clinker and subsequently flows into the furnace 16. The first cooling gas flow partially or completely forms, for example, the combustion gas of the furnace 16. The high fraction of oxygen in the combustion gas results in a preheater exhaust gas which consists essentially of CO2 and water vapor and has the advantage that complex downstream purification methods for exhaust gas purification can be omitted. Furthermore, a reduction of the process gas amounts is achieved, so that the installation can be dimensioned significantly smaller.

Inside the cooler 18, the clinker to be cooled is moved in the conveyance direction F. The second cooling gas chamber section 38 preferably has a dynamic, in particular movable grate, which adjoins the static grate in the conveyance direction F. For example, a plurality of fans is arranged below the dynamic grate, by means of which the second cooling gas flow is blown from below through the dynamic rate. The second cooling gas flow is, for example, air.

In FIG. 1, for example, a crushing unit 48 adjoins the dynamic grate of the second cooling gas chamber section 38. At the crushing unit 48, a further dynamic grate adjoins below the crushing unit 48. The cold clinker preferably has a temperature of 100° C. or less upon leaving the cooler 18.

Cooler exhaust air is discharged from the second cooling gas chamber section 38, for example, and guided into a separator, for example a cyclone, for separating solids. The solids are supplied back to the cooler 18, for example. An air-air heat exchanger is connected downstream of the separator, so that the cooler exhaust air pre-heats air inside the heat exchanger, which is supplied, for example, to a raw mill.

Figure 3:
FIG. 3 is a schematic view of an installation for thermal treatment of raw material according to still another exemplary embodiment.
Figure 3:
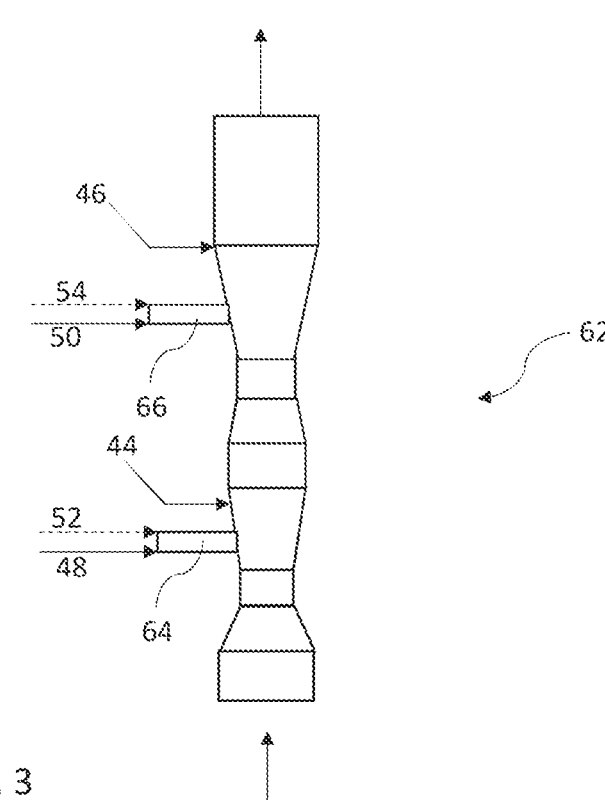

FIG. 3 shows a further exemplary embodiment of an installation for thermal treatment 14, in particular a calcinator, which at least partially corresponds to the installation 14 of FIG. 1, wherein identical reference signs represent identical elements. For example, two fuel dispensing devices 64, 66 are attached to the riser line 62, via each of which fuel and inert gas are dispensed together.

The riser line 62 of the installation 14 has a plurality of different cross-sectional areas. The fuel dispensing devices 64, 66 of the installation 14 are attached, for example, without angle offset, on the same side of the riser line 62, but at different height levels. In the flow direction of the gas within the riser line 62, a raw meal inlet 44, 46 is preferably respectively connected directly upstream and/or downstream from each fuel dispensing device. The fuel inlet 48, 50 and the inert gas inlet 52, 54 are each arranged at the fuel dispensing device 64, 66 of the calcinator 14, in particular at the same height with the respective fuel dispensing device.

The cross-sectional constrictions ensure balanced mixing within the riser line and thus result in homogenization of the combustion and the temperature distribution in the longitudinal and transverse directions of the riser line of the calcinator.

Figure 4:
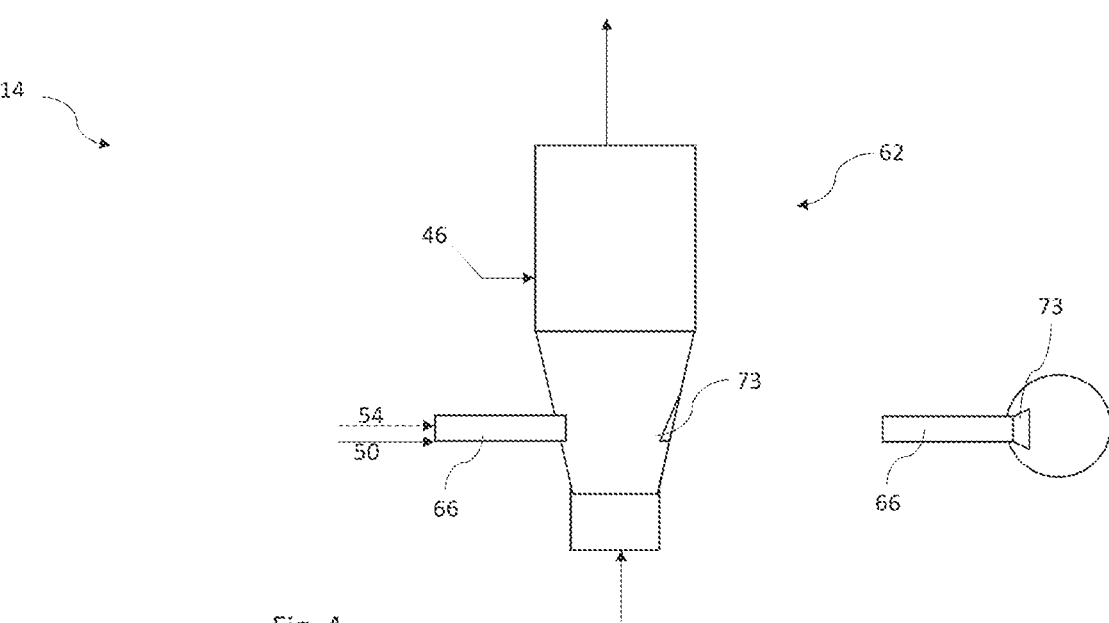
FIG. 4 is a schematic, detail view of an installation for thermal treatment according to yet a further exemplary embodiment.

FIG. 4 shows a detail of an installation 14, in particular a calcinator 14, according to FIGS. 1 to 3, wherein identical reference signs represent identical elements. The installation 14 has a guiding element 73, which is attached in the left illustration, for example, inside the riser line 62 and is attached in the right illustration, for example, to the fuel dispensing device in the special form of a flame tube.

In the left illustration, the guiding element 73 is arranged in such a way that it causes a constriction of the cross section of the riser line 62. The guiding element 73 is in particular made plate-shaped, chamber-shaped, or box-shaped and is attached to the inner wall of the riser line 62 and, for example, at the same height and opposite to the fuel dispensing device 66.

In the right illustration, the guiding element 73 has, for example, the form of a diffuser, wherein the cross section of the guiding element 73 increases in the flow direction of the fuel. The guiding element 73 is attached at the fuel dispensing device, in particular at the orifice of the fuel dispensing device into the riser line 62 and enables in particular a targeted introduction of the fuel into the riser line 62. It is also conceivable that the guiding element 73 terminates flush with the riser line and does not protrude therein, so that a uniform introduction of the fuel into the riser line 62 is enabled.

The guiding element 73 is formed, for example, from a high-temperature-proof ceramic or a fiber composite material.

LIST OF REFERENCE SIGNS

10 cement production plant
12 preheater
14 installation for thermal treatment/calcinator
16 furnace
18 cooler
20 cyclone
22 preheater exhaust gas
28 burner or burner lance of the furnace
30 fuel inlet of the furnace
32 first treatment region
33 second treatment region
34 cooling gas chamber
36 first cooling gas chamber section
38 second cooling gas chamber section
40 cross-sectional constriction
42 cross-sectional constriction
44 first raw meal inlet
46 second raw meal inlet
48 first fuel inlet
50 second fuel inlet
52 first inert gas inlet
54 second inert gas inlet
56 temperature measuring unit
58 temperature measuring unit
60 regulating unit
62 riser line
64 fuel dispensing device
66 fuel dispensing device
73 guiding element

What is claimed is:

1. A method for thermal treatment of free-floating raw material including at least one of cement raw meal or mineral products, the method comprising:

introducing, through a fuel inlet, fuel into a riser line for guiding hot gases;

introducing, through a raw meal inlet, raw meal into the riser line, wherein the raw meal is introduced into the riser line upstream of the fuel inlet in a flow direction of gas; and introducing, through an inert gas inlet, inert gas into the riser line;

wherein the riser line includes at least two treatment regions that are arranged in succession in the flow direction, wherein each of the at least two treatment regions has a different diameter, wherein the raw meal is introduced into an upstream treatment region of the at least two treatment regions in the flow direction;

wherein each of the two treatment regions includes a section of the riser line including at least one inlet for introducing raw meal, fuel, and/or inert gas;

wherein each of the two treatment regions includes a middle region having a constant diameter, an upstream region arranged upstream of the middle region having an increasing diameter, and a downstream region arranged downstream of the middle region having a decreasing diameter.

2. The method of claim 1 comprising:

ascertaining a temperature with a temperature measuring unit inside the riser line; and regulating an amount of at least one of raw meal, inert gas, or fuel in the riser line based on the temperature that is ascertained.

3. The method of claim 1 wherein the fuel inlet is an upstream fuel inlet, wherein fuel is introduced into the riser line via the upstream fuel inlet and a downstream fuel inlet, with the upstream and downstream fuel inlets being arranged in succession in the flow direction, wherein more fuel is introduced at the upstream fuel inlet than at the downstream fuel inlet.

4. The method of claim 1 wherein an amount of raw meal that is introduced into the upstream treatment region corresponds to 20% to 60% of a total amount of raw meal introduced into the riser line.

5. The method of claim 1 wherein the upstream region has an opening angle of 12° to 30°.

6. The method of claim 1 wherein the riser line has at least one cross-sectional constriction located between the two treatment regions, wherein a diameter of the cross-sectional constriction is smaller than diameters of the two treatment regions.

7. The method of claim 1 wherein the inert gas is $CO_2$.

8. The method of claim 1 wherein the inert gas is water vapor.

9. A method for thermal treatment of free-floating raw material including at least one of cement raw meal or mineral products, the method comprising:

introducing, through a fuel inlet, fuel into a riser line for guiding hot gases;

introducing, through a raw meal inlet, raw meal into the riser line, wherein the raw meal is introduced into the riser line upstream of the fuel inlet in a flow direction of gas; and introducing, through an inert gas inlet, inert gas into the riser line;

wherein the riser line includes at least two treatment regions that are arranged in succession in the flow direction, wherein each of the at least two treatment regions has a different diameter, wherein the raw meal is introduced into an upstream treatment region of the at least two treatment regions in the flow direction;

wherein the riser line has at least one cross-sectional constriction located between the two treatment regions, wherein a diameter of the cross-sectional constriction is smaller than diameters of the two treatment regions.

10. The method of claim 9, further comprising:

ascertaining a temperature with a temperature measuring unit inside the riser line; and regulating an amount of at least one of raw meal, inert gas, or fuel in the riser line based on the temperature that is ascertained.

11. The method of claim 9 wherein the fuel inlet is an upstream fuel inlet, wherein fuel is introduced into the riser line via the upstream fuel inlet and a downstream fuel inlet, with the upstream and downstream fuel inlets being arranged in succession in the flow direction, wherein more fuel is introduced at the upstream fuel inlet than at the downstream fuel inlet.

12. The method of claim 9 wherein the inert gas is $CO_2$.

13. The method of claim 9 wherein the inert gas is water vapor.

* * * * *